Aug. 12, 1969   C. H. OWEN, JR   3,460,696
MULTIPURPOSE TRAILER
Filed Sept. 29, 1967   3 Sheets-Sheet 3

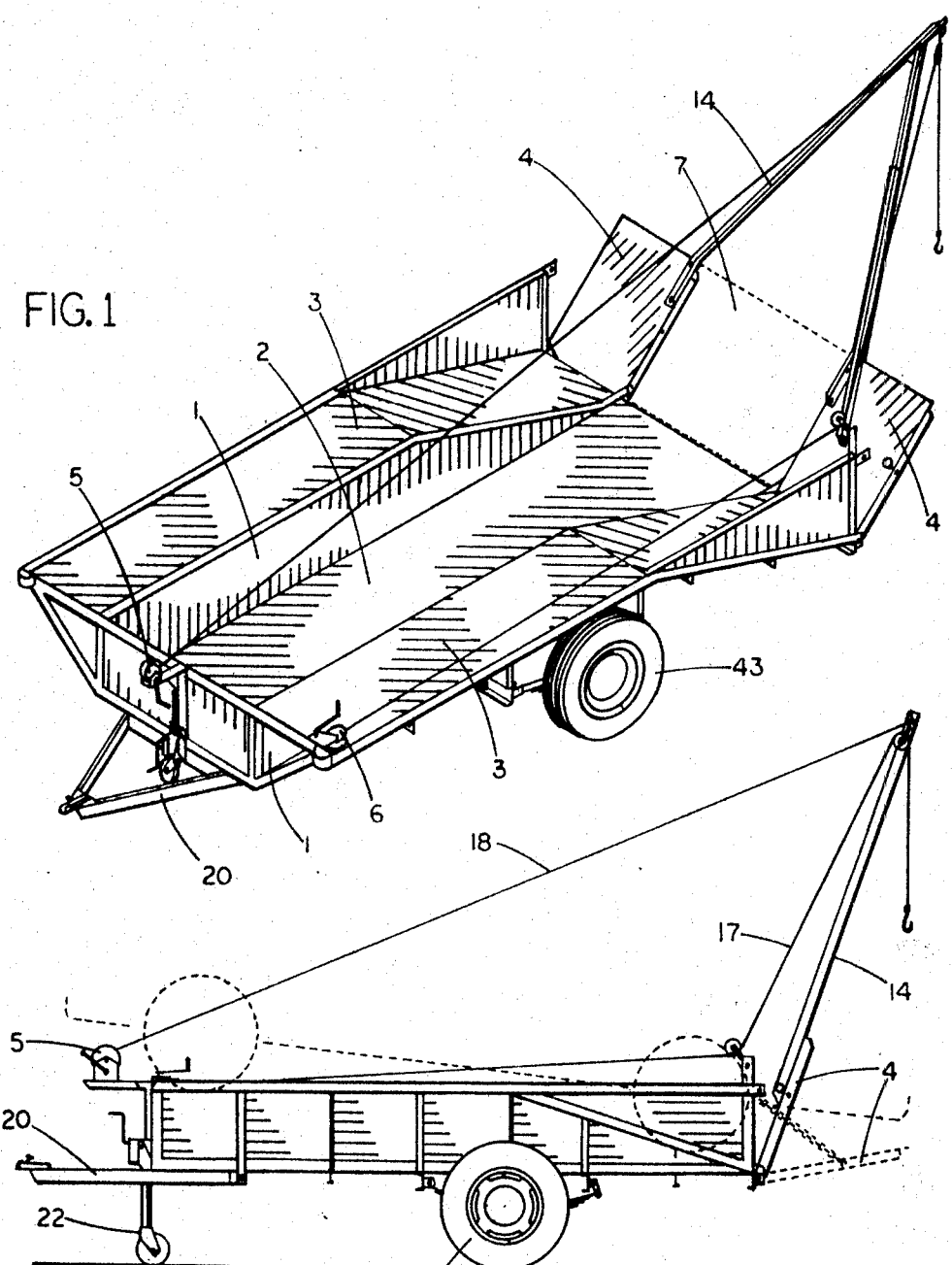

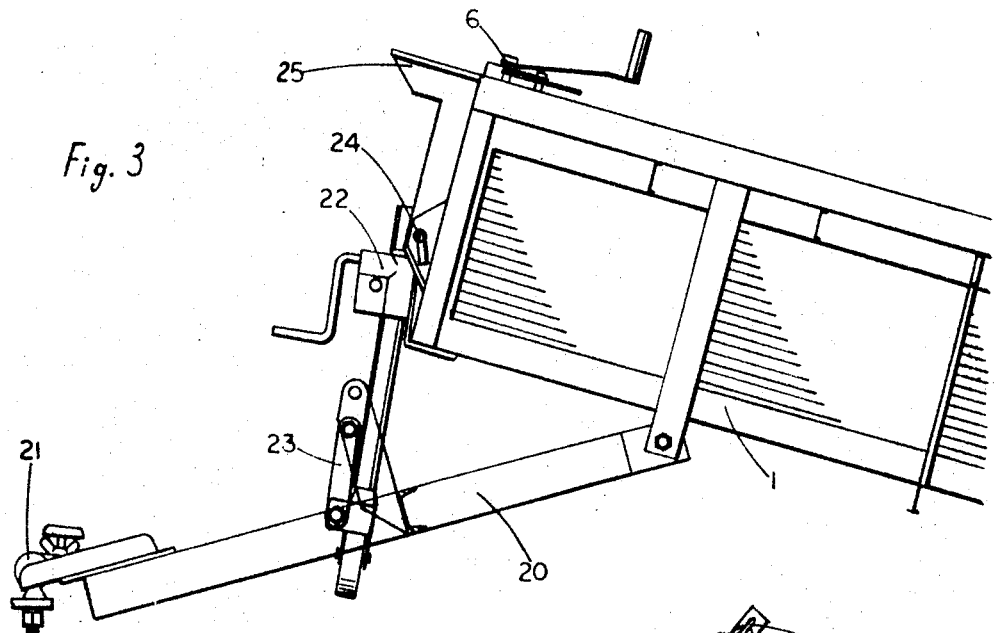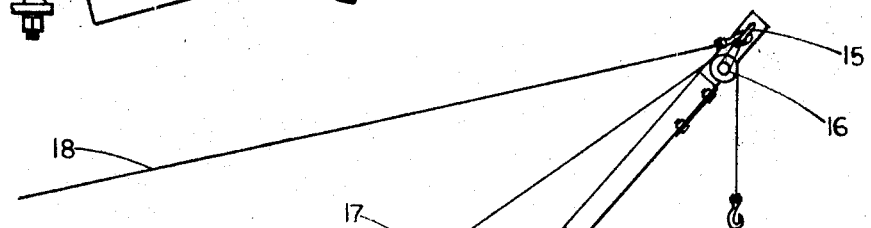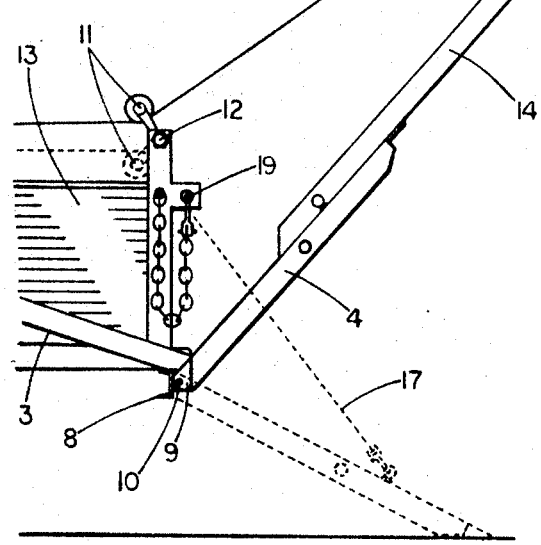

INVENTOR
Clure H. Owen, Jr.

United States Patent Office 3,460,696
Patented Aug. 12, 1969

3,460,696
MULTIPURPOSE TRAILER
Clure H. Owen, Jr., 35 Clinton St.,
White Plains, N.Y. 10603
Filed Sept. 29, 1967, Ser. No. 671,840
Int. Cl. B60p 1/64; B66c 21/00
U.S. Cl. 214—505          11 Claims

ABSTRACT OF THE DISCLOSURE

A trailer vehicle having a unitized frame and bed with plate girder sides forming longitudinal frame rails and a bottom portion extending between the lower edges of the plate girder sides. Each of the plate girder sides has attached thereto at the upper edge thereof a ramp member extending laterally outwardly therefrom to serve as a support for the wheels of a vehicle upon the trailer. A portion of each of the plate girder sides is of progressively reduced height towards the rear of the trailer, and the portions of the ramp members associated therewith form downwardly sloping ramps.

---

This invention relates to multi-purpose trailers.

One object is to provide a universal trailer for a garageman or competition car owner by providing a chassis with a pit, to carry cargo and a vehicle simultaneously. A boom is added to a ramp tail gate for removing engines and for loading the trailer. Detachable tow bar, winches and tackle are provided for auto salvaging.

Another object is to provide for conversion to a boat trailer. Roller brackets are bolted to the bed and tail gate. The trailer is tilted by a hand powered jack stand which provides angle control.

Another object is to provide for conversion to a house trailer by the addition of a camper top with removable end sections so that a boat or vehicle may be carried to a recreation area.

Another object is to provide for conversion of two trailer chassis bolted together to serve as a temporary bridge.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

It is anticipated that the invention may be adapted into a chassis for a truck while keeping most of the features now embodied in the trailer form.

Other objects and advantages of the invention will become apparent in the following description of the accompanying drawings wherein:

FIG. 1 is a perspective view of a trailer according to one form of the invention with the center section of the tail gate removed and shown in dotted lines, and with an optionally attachable crane system in position.

FIG. 2 is a side elevation of the trailer shown in FIG. 1 with a fragmentary view of a car in normal position; which is shown in dotted lines.

FIG. 3 is an enlarged fragmentary elevation of the tilting mechanism shown in a partially extended position.

FIG. 4 is an enlarged fragmentary elevation of the tail gate with crane system attached and as a ramp without crane system, which is shown in dotted lines.

FIG. 5 is a top view of a car bumper with winch and hitch attached in extended position and retracted position; which is shown in dotted lines.

Figure 6:
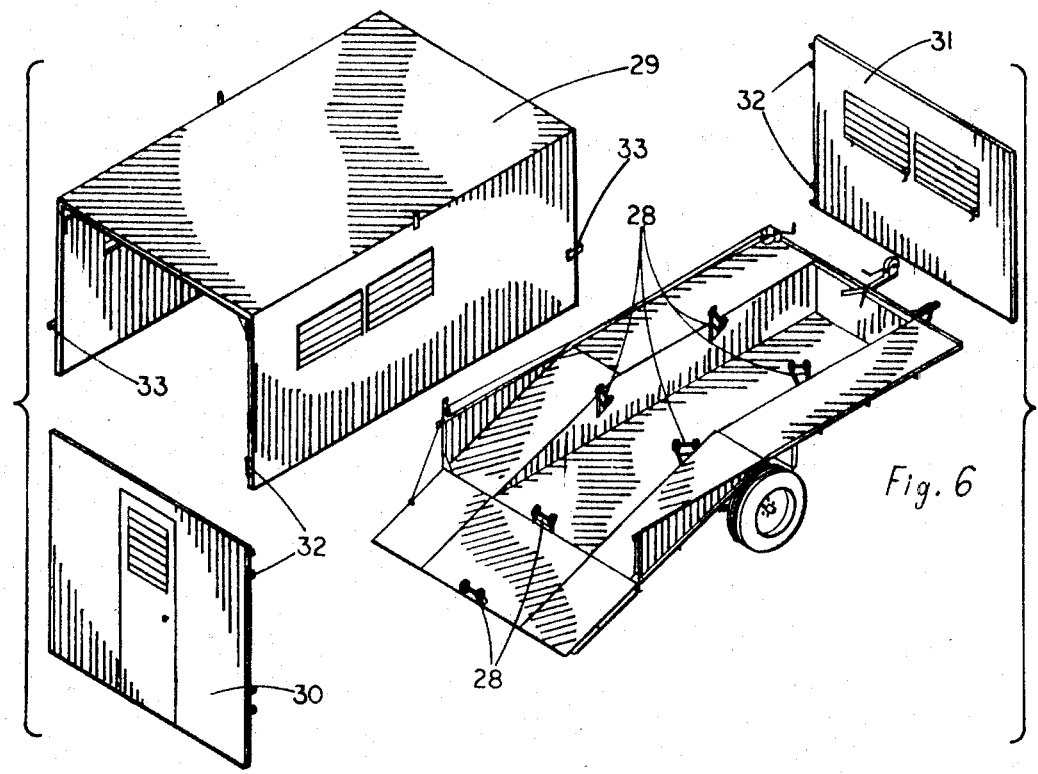
FIG. 6 is an exploded perspective view of the trailer with boat rollers attached and camper top shown in disassembled form.

Referring to the drawings in detail, FIGS. 1–4 show a universal trailer according to one form of the invention, which includes a pair of plate girders 1 which serves as longitudinal frame rails and as sides of cargo area 2 of the trailer. Ramps 3 are provided for the loading and transporting of vehicles such as automobiles and the like as shown by dotted lines in FIG. 2. Tail gate ramps 4 are provided for the loading of vehicles which are driven on from the roadway or winched on by one or both of the winches 5 and 6.

A tail gate center section 7 is provided for ramp loading of small vehicles such as lawn mowers and the like, and for the containing of loose cargo. The tail gate center section 7 is removed as shown in FIG. 1 when using the crane system to load heavy objects. A detailed side elevation of the tail gate is shown in FIG. 4. The rear of the chassis is channel iron 8. Welded to the channel iron are four square plates 9 placed in line with the outer edge and inner edge of each ramp 3. Holes 10 are provided for bolts which also pass through holes in the tail gate ramps 4. The center section 7 is bolted to the ramps 4. The cable from the side winch 6 is passed through the block 11 that engages an eyebolt 12 mounted on trailer side 13. When the crane system is to be utilized, the boom 14 is bolted to the ramps 4. The boom consists of two members which are joined together by bolts or other suitable means so that the members may be disassembled for compact storage. The boom is further provdied with an eyebolt 15 to which a block 16 is engaged. The cable 17 from the block 11 is passed through the block 16 on the boom and then down to the object to be lifted (not shown). The cable 18 from the center winch 5 is hooked onto the eyebolt 15 on the boom to provide for raising or lowering the boom. If a heavy object such as an auto engine is to be loaded into the cargo area 2 and it cannot be ramp loaded, then the crane system is utilized. With the center section of the tail gate 7 removed, the object is hoisted free of the ground by the side winch 6. The center winch 5 is used to raise the boom 14 to the vertical position. The object is now in position at the rear edge of the cargo area 2. The object can now either be moved forward by hand or the tail gate can be secured by the locking hooks 19 and then the center winch cable 18 can be disconnected from the boom 14 and be engaged to the object in order to pull said object forward. Removing an engine from a car or truck would be done in a like manner.

When the tail gate is being used as a ramp as shown in FIG. 4 by dotted lines, the cable 17 from the side winch 6 may be used to raise and lower the tail gate.

A tilting mechanism as shown in FIG. 3 is provided for assisting the loading of vehicles and boats. The tilting mechanism consists of a tow bar 20 pivotally mounted to the plate girders 1 and attached to the draft vehicle by a conventional ball hitch 21. The jack stand 22, which is rigidly mounted to the chassis, engages the tow bar 20 by a pinned end link 23. The pins are mounted on the tow bar 20 and the jack stand 22, and have threaded nuts or other means to allow for the removal of the pinned end link 23 when jack stand 22 is used for the normal function of supporting the front end of the trailer when not hitched to a draft vehicle.

When the jack strand 22 is connected to the tow bar 20 by the pinned end link 23, the extension of the jack stand 22 causes the tow bar 20 to pivot relative to the chassis; this action causes the chassis to tilt to the rear. Lateral as well as longitudinal control of trailer motion is provided by the three point connection of the A frame type tow bar 20; vertical control being provided by the jack stand 22. The tow bar 20 is provided with bolts or a quick disconnect pin 24 for securing to the chassis when trailer is being towed.

A bumper mounted winch as shown in FIG. 5 is provided for by removing the center winch 5 from its bracket 25 and mounting on a bumper clamp 26 from the universal hitch 27.

A boat trailer is provided for as shown in FIG. 6 by the addition of roller brackets 28 bolted to the plate girders 1 and tailgate center sections 7. The center winch 5 is used for loading and unloading of boats.

A camper trailer is provided for, as shown in FIG. 6, by the three piece top 29, 30, 31. The end sections 30 and 31 are removable from the center section 29. This arrangement allows for a boat or car to be carried simultaneously to a recreation or sports area. The boat or car may then be unloaded and the end sections 30 and 31 may then be installed and the trailer may be used as a camper. This combination is designed to meet the needs of a camper who wants to take a boat along, or the race car owner who must spend several days at a race track. If work is to be performed on the underside of a car, the rear section 30 of the camper top can be removed and the car placed halfway onto the trailer. Servicing is then carried out from the pit 2. The center and front sections 29 and 31 of the camper top remain in place for protection from inclement weather. The front and rear sections 30 and 31 are light enough for hand installation by one or two persons. Hinges 32 and catches 33 may be employed for swinging end sections 30 and 31 out of the way and into storage position on opposite sides of the center section 29.

Figure 7:
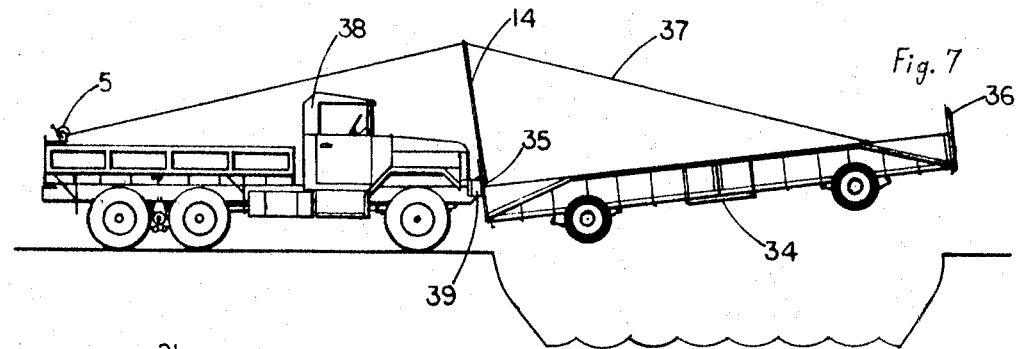
FIG. 7 is a side elevation of two coupled trailers without tilting mechanism being placed across a stream as a temporary bridge.

A temporary road bridge of the plate girder cantilever type is provided for when two trailers are bolted together and the tow bars 20 are replaced by a pair of tension members 34. The jack stand 22, including the center winch bracket 25, must be unbolted first. The bridge may then be moved into position by hand where the wheels are able to find support. However, where the obstacle to be bridged is deep and there is access to only one side, a field expedient method is indicated in FIG. 7. The trailers are first joined some distance from the obstacle to be bridged. The crane boom 14 is attached to one of the tail gates 35. From the other tail gate 36 a cable 37 is strung to the crane boom 14 and then to a center winch 5 that is temporarily attached to the rear of a suitable truck 38. Where trucks are available with permanent power winches, the cable from said winches may be used by the driver to raise and lower the bridge by installing one or more blocks at points along the cable line 37 shown in FIG. 7. The front bumper 39 of the truck and the tail gate 35 are then prevented from sliding relative to each other by suitable means and then both trailers are winched off the ground by the winch 5. The bridge and truck may then be driven slowly to the edge of the obstacle as shown in FIG. 7. The bridge is then lowered into position by the winch 5. If a suitable crane is available, then the crane would be used to place the bridge into position across the obstacle. The boom 14 should be removed before vehicles cross the bridge. However, the tail gates 35 and 36 may be retained as ramps which in some cases could be used to extend the span of the bridge. The use of the trailers as a bridge is obtained without compromising the efficiency of an individual trailer to perform the other tasks for which it was primarily designed. This efficiency is mainly due to the inherent high flexure strength of the aforementioned plate girders 1 which serve as both longitudinal frame rails and as sides of the pit 2.

Figure 8:
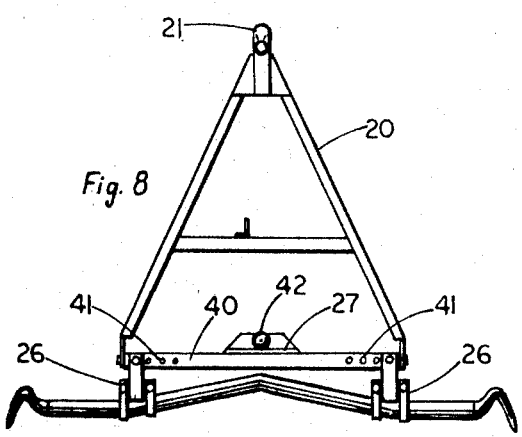
FIG. 8 is a top view of part of the tilting mechanism and the hitch attached to a front bumper of a car as a tow bar.

The universal hitch 27 and the trailer tow bar 20 may be utilized as a tow bar as shown in FIG. 8 for flat towing of one vehicle by another when the trailer is not in use. The universal hitch consists of an angle iron bar 40 that is provided with flat ends with a hole drilled in the center of each end. The trailer tow bar 20 is then pivotally mounted to bolts which pass through said holes. The universal hitch bar 40 is further provided with regularly spaced holes 41 on the upper surface. Bumper clamps 26 are attached to these holes by bolts so that the hitch will fit bumpers of various shapes. The bar 40 is further provided with a ball 42 mounted in the center of the bar 40 for use as a normal trailer hitch. However, a permanent frame mounted hitch is preferred where possible. The tow bar may also be engaged to the vehicle to be towed by attaching to pivots that are bolted or otherwise connected to the bumper or frame.

The trailer is further provided with a license plate holder, safety clamps, suitable lights, wiring, and optional brake systems. Other under carriages such as tandem axle or dual wheels may be used if ramp 3 height is to be reduced.

I claim:
1. A trailer vehicle of the type having a body with two or more wheels longitudinally centrally positioned thereon for the support thereof and having a box-like bed for containing and supporting cargo,
   wherein the improvement comprises the provision that said bed comprises a unitized frame and bed,
   said bed comprising a pair of plate girder sides which also form longitudinal frame rails.
   said bed including a bottom portion extending between the lower edges of said plate girder sides,
   a front closure member for said bed extending between the front edges of said plate girder sides and attached to said bottom member to enclose the front portion of said bed,
   each of said plate girder sides having attached thereto at the upper edge thereof a ramp member extending laterally outwardly therefrom and adapted to serve as a support for the laterally spaced apart wheels of a vehicle upon said trailer,
   at least a portion of each of said plate girder sides being of progressively reduced height towards the rear of said trailer,
   and the portions of said ramp members associated with said reduced height portions of said plate girder sides forming downwardly sloping ramps at the rear of said trailer body to assist in loading and unloading a vehicle upon said trailer by rolling the wheels of the vehicle upon said sloping ramps.

2. A trailer as claimed in claim 1 including
   a tail gate hingedly mounted at the rear edge of said trailer body at an elevation to position the upper surface of said tail gate substantially in horizontal alignment with the ends of the sloping portions of said ramps when said tail gate is open so that said tail gate forms an effective extension of said ramps.

3. A trailer as claimed in claim 2 including substantially triangular side portions extending upwardly from the outer side edges of said downwardly sloping ramps at the rear of said trailer body and forming substantially vertical closure joints and supports for said tail gate to thereby close said trailer bed.

4. A trailer as claimed in claim 2 including
   a boom detachably mounted to said tail gate to convert said tail gate into a hinged crane boom,
   a winch having cable connected to said boom to determine the angle of elevation thereof,
   a second winch attached to said trailer body and having a cable for lifting loads, said boom being provided with a block,
   and said last-mentioned cable being threaded over said block for attachment to a load to be lifted.

5. A trailer as claimed in claim 1 including a jack stand mounted on the front of said trailer body and operable to support the front of said trailer when it is disconnected from a towing vehicle, said trailer including an A-frame tongue having the legs of the A-frame hingedly connected to the bottom of said trailer bed at a position spaced substantially towards the rear of the trailer from the front edge thereof and including a hitch for attachment to a towing vehicle at the forward-most portion thereof, disconnectable means for securing said tongue to the front portion of said trailer body to prevent relative movement thereof about said hinged connection, linkage means for connecting said jack stand to said hinged tongue and operable when said securing means is disconnected to raise the front edge of said trailer body above said tongue by causing said tongue to rotate downwardly about said hinged connection while said tongue is attached to a support such as a towing vehicle at the hitch portion thereof, said movement of said trailer body causing the trailer body to tilt about the supporting wheels to lower the rear portion thereof to assist in loading and unloading the trailer.

6. A trailer as claimed in claim 1 including
a bar frame member having dimensions similar to the dimensions of a conventional automobile bumper at the upper edge of the front of said trailer body,
a de-mountable winch having an adjustable clamping means,
said winch being connected to said bar by said adjustable clamping means.

7. A trailer as claimed in claim 1 including
at least one roller member mounted by a bracket at the center of said bottom portion of said bed at the rear edge thereof and protruding upwardly to engage and support the center portion of a boat to be loaded upon the trailer, and a plurality of additional rollers mounted at the upper edges of each of said plate girder sides and protruding upwardly and inwardly towards the center of said trailer bed to support a boat at the sloping undersides thereof as it is loaded upon said trailer.

8. A trailer as claimed in claim 1 including
a de-mountable camper top comprising a U-shaped main body member having a roof and closed sides permanently attached thereto and having means for attaching said main body member to said trailer body,
said camper top also including front and rear end panels separately attachable to enclose said camper top.

9. A trailer as claimed in claim 1 including
means at the front portion of said trailer body for securely fastening the trailer body to the front portion of the trailer body of a second trailer of identical construction,
the ramp portions of said trailer bodies being in alignment so that said bodies form a rigid combined structure which can be used as a bridge.

10. A trailer as claimed in claim 9 including
a tail gate hingedly mounted at the rear edge of said trailer body,
and a boom detachably mounted to said tail gate to assist in lifting the combined trailer bodies to place them over an obstruction to be bridged.

11. A trailer as claimed in claim 1 including a de-mountable A-frame tow bar that attaches between the bumpers or frames of a draft vehicle and a vehicle to be towed.
engagement of said tow bar and said vehicle to be towed being accomplished by a universal bumper hitch or by permanently affixed pivots.

References Cited

UNITED STATES PATENTS

| | | | |
|---|---|---|---|
| 2,323,279 | 6/1943 | Van Zelm | 214—85XR |
| 2,966,274 | 12/1960 | Price | 214—85 |
| 3,104,127 | 9/1963 | Swartzwelder | |
| 3,243,161 | 3/1966 | Green | 214—515 XR |
| 3,352,440 | 11/1967 | Wilson | 214—85 |
| 3,378,152 | 4/1968 | Warner | 214—46 |

ALBERT J. MAKAY, Primary Examiner

U.S. Cl. X.R.

214—85, 86; 296—1, 61